US012675248B2

(12) United States Patent
Chen et al.

(10) Patent No.: US 12,675,248 B2
(45) Date of Patent: Jul. 7, 2026

(54) SYSTEM AND METHOD FOR MONITORING STAGE

(71) Applicant: BOE Technology Group Co., Ltd., Beijing (CN)

(72) Inventors: Naichuan Chen, Beijing (CN); Mingming Yang, Beijing (CN); Zhe Zhang, Beijing (CN); Kun Li, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 382 days.

(21) Appl. No.: 18/282,222

(22) PCT Filed: Aug. 10, 2022

(86) PCT No.: PCT/CN2022/111486
§ 371 (c)(1),
(2) Date: Sep. 15, 2023

(87) PCT Pub. No.: WO2024/031444
PCT Pub. Date: Feb. 15, 2024

(65) Prior Publication Data
US 2025/0036339 A1 Jan. 30, 2025

(51) Int. Cl.
*G06F 3/14* (2006.01)

(52) U.S. Cl.
CPC ........ *G06F 3/14* (2013.01); *G05B 2219/2664* (2013.01)

(58) Field of Classification Search
CPC ....... A63J 1/00; G05B 2219/2664; G06F 3/14
See application file for complete search history.

(56) References Cited

U.S. PATENT DOCUMENTS

| | | | |
|---|---|---|---|
| 6,304,981 B1 * | 10/2001 | Spears ................. | G06F 11/004 714/24 |
| 10,873,726 B1 * | 12/2020 | Maldonado .......... | H04N 17/004 |
| 2002/0072868 A1 * | 6/2002 | Bartone ............ | H02J 13/00002 702/62 |

(Continued)

FOREIGN PATENT DOCUMENTS

| | | |
|---|---|---|
| CN | 202268748 U | 6/2012 |
| CN | 203311254 U | 11/2013 |

(Continued)

*Primary Examiner* — Vincent H Tran
(74) *Attorney, Agent, or Firm* — XSENSUS LLP

(57) ABSTRACT

Provided is a system for monitoring a stage. The system comprises: a plurality of detection devices, a central control apparatus, and a presentation apparatus, wherein the plurality of detection devices are configured to detect environmental information of an environment where at least part of the stage apparatuses are located in real time, and to send the detected environmental information; the central control apparatus is connected to the at least part of the stage apparatuses and the presentation apparatus respectively, and configured to receive the environmental information, to acquire apparatus state information of at least one of the stage apparatuses and the detection devices, and to present the environmental information and the apparatus state information through the presentation apparatus.

13 Claims, 5 Drawing Sheets

Stage model

(56)　　　　　References Cited

U.S. PATENT DOCUMENTS

| | | | | |
|---|---|---|---|---|
| 2004/0216163 A1* | 10/2004 | Whitcomb | ......... | H04N 21/2143 |
| | | | | 725/74 |
| 2008/0059884 A1* | 3/2008 | Ellis | ................... | H04N 21/4334 |
| | | | | 715/721 |
| 2010/0214417 A1* | 8/2010 | Gennari | ................... | G06T 7/292 |
| | | | | 340/3.1 |
| 2017/0364046 A1* | 12/2017 | Westrick, Jr. | ......... | H04L 12/283 |
| 2018/0276768 A1* | 9/2018 | Mori | ..................... | G06Q 50/06 |
| 2019/0190788 A1* | 6/2019 | Bugge | ................. | G06F 11/3062 |
| 2021/0317633 A1* | 10/2021 | Sherlock | ................... | E02F 9/18 |
| 2022/0089283 A1* | 3/2022 | Ifill | ......................... | B64C 1/061 |
| 2022/0374806 A1* | 11/2022 | Singh | ..................... | H04L 67/12 |
| 2024/0348897 A1* | 10/2024 | Tan | ....................... | G01J 5/0025 |

FOREIGN PATENT DOCUMENTS

| | | | | | |
|---|---|---|---|---|---|
| CN | 203386040 | U | | 1/2014 | |
| CN | 103841299 | A | | 6/2014 | |
| CN | 105049808 | A | | 11/2015 | |
| CN | 105159154 | A | | 12/2015 | |
| CN | 105242618 | A | | 1/2016 | |
| CN | 108319241 | A | | 7/2018 | |
| CN | 109741767 | A | | 5/2019 | |
| CN | 111948995 | A | | 11/2020 | |
| CN | 212012708 | U | * | 11/2020 | |
| CN | 112055169 | A | | 12/2020 | |
| CN | 112526899 | A | * | 3/2021 | ......... G05B 19/0425 |
| CN | 114698203 | A | | 7/2022 | |
| EP | 2790075 | A2 | | 10/2014 | |
| WO | 96/41098 | A1 | | 12/1996 | |
| WO | 2016/153164 | A1 | | 9/2016 | |

* cited by examiner

10

SYSTEM AND METHOD FOR MONITORING STAGE

CROSS-REFERENCE TO RELATED APPLICATION

The present disclosure is a U.S. national phase application based on PCT/CN2022/111486, filed on Aug. 10, 2022, which is incorporated herein by reference in its entirety.

TECHNICAL FIELD

The present disclosure relates to the field of stage control technologies, and in particular, to a system and a method for monitoring a stage.

BACKGROUND

At present, there are a wide variety of stage apparatuses, including lighting apparatuses, audio apparatuses, display apparatuses, and the like. Through reasonable control on these stage apparatuses, a required stage effect is achieved. Once the stage apparatuses fail, severe performance accidents may be caused.

SUMMARY

The embodiments of the present disclosure provide a system and a method for monitoring a stage. The technical solutions are as follows.

The embodiments of the present disclosure provide a system for monitoring a stage, including: a plurality of detection devices, a central control apparatus, and a presentation apparatus; wherein the plurality of detection devices are configured to detect information of an environment where at least part of stage apparatuses are located in real time, and to send the detected environmental information; and the central control apparatus is connected to the at least part of the stage apparatuses and the presentation apparatus respectively, and configured to receive the environmental information, to acquire apparatus state information of at least one of the stage apparatus and the detection devices, and to present the environmental information and the apparatus state information through the presentation apparatus.

Optionally, the system for monitoring the stage further includes an intermediate apparatus, wherein the intermediate apparatus is configured to convert the environmental information detected by a target detection device to a message under a target topic, wherein the target detection device is any one of the plurality of detection devices, the target topic is a topic corresponding to the target detection device, and different topics correspond to different detection devices; and to send a message under the target topic; and the central control apparatus is configured to acquire the message by subscribing the topic to receive the environmental information.

Optionally, the intermediate apparatus is configured to form a message queue with messages corresponding to the plurality of detection devices, and to send the message queue to the central control apparatus; and the central control apparatus is configured to extract the environmental information detected by the plurality of detection devices from the message queue.

In some embodiments, the apparatus state information includes online state information of the detection devices, which indicates whether communication links between the detection devices and the central control apparatus are disconnected; and the central control apparatus is configured to determine the online state information of the detection devices based on the received message queue.

Exemplarily, the central control apparatus is configured to compare an identifier of a detection device corresponding to each message in the received message queue with a stored identifier of the detection device; and to determine the online state information of the detection devices according to the comparison result.

In some embodiments, the apparatus state information includes online state information of the at least part of the stage apparatuses, which indicates whether communication links between the at least part of the stage apparatus and the central control apparatus are disconnected; the at least part of stage apparatuses are configured to periodically send heartbeat messages to the central control apparatus; and the central control apparatus is configured to determine the online state information of the at least part of the stage apparatuses based on the received heartbeat messages.

Optionally, the apparatus state information includes abnormality information of at least one of the detection devices and the stage apparatuses; and the central control apparatus is configured to determine, in a case that an offline duration of an offline apparatus exceeds an offline duration threshold or a number of reconnections of an offline apparatus exceeds a threshold of reconnections, that the offline apparatus is abnormal, wherein the offline apparatus is the detection device or the stage apparatus.

Optionally, the stage apparatuses include a play control apparatus and a display apparatus, wherein the play control apparatus is configured to control a play content of the display apparatus; and the central control apparatus is connected to the play control apparatus, and configured to receive a program playing list sent by the play control apparatus and to present the program playing list through the presentation apparatus.

Optionally, the central control apparatus is further configured to present, by the presentation apparatus, at least one of the following contents: a stage model, an operation state of the central control apparatus, a number of abnormalities of the stage apparatuses, a countdown for a target performance event, and energy consumption information of the stage apparatuses.

Optionally, the presentation apparatus is further configured to provide a control interface for the stage apparatuses; and the central control apparatus is further configured to output an apparatus control instruction for a target stage apparatus according to a control operation on the control interface.

Optionally, the control interface includes a plurality of stage apparatuses and a control corresponding to each of the stage apparatuses; and the plurality of stage apparatuses include at least one of lighting apparatuses, display apparatuses, audio apparatuses, stage lifting apparatuses, and smoke machines.

Optionally, the apparatus control instruction includes a centralized control instruction and a single-path control instruction, wherein the centralized control instruction is configured to control a plurality of stage apparatuses of a same category; and the single-path control instruction is configured to control one of the corresponding stage apparatuses.

Optionally, the central control apparatus is further configured to sequentially send, in response to a shutdown operation, a shutdown instruction to each of the stage apparatuses according to a set time interval, wherein different set time intervals correspond to different types of stage apparatuses; or, the central control apparatus is further configured to send, in response to a shutdown operation, a shutdown instruction to each of the stage apparatuses, wherein the shutdown instruction indicates that each of the stage apparatuses shuts down according to a respective set delay, different delays corresponding to different types of stage apparatuses; or, the central control apparatus is further configured to send, in response to a shutdown operation, a first shutdown instruction to the intermediate apparatus, wherein the intermediate apparatus is configured to send a second shutdown instruction to each of the corresponding stage apparatuses according to delays for different types of stage apparatuses, different delays corresponding to different types of stage apparatuses.

The embodiments of the present disclosure further provide a method for monitoring a stage, including: detecting, by a plurality of detection devices, environmental information of an environment where at least part of stage apparatuses are located in real time; sending, by the plurality of detection devices, the environmental information to a central control apparatus; receiving, by the central control apparatus, the environmental information; acquiring, by the central control apparatus, apparatus state information of at least one of the stage apparatuses and the detection devices; and presenting, by the central control apparatus, the environmental information and the apparatus state information through a presentation apparatus.

Optionally, sending, by a plurality of detection devices, the environmental information to the central control apparatus includes: sending, by the plurality of detection devices, the environmental information to an intermediate apparatus; converting, by the intermediate apparatus, the environmental information detected by a target detection device to a message under a target topic, wherein the target detection device is any one of the plurality of detection devices, the target topic is a topic corresponding to the target detection device, and different topics correspond to different detection devices; and sending, by the intermediate apparatus, the message under the target topic to the central control apparatus; and receiving, by the central control apparatus, the environmental information includes: acquiring, by the central control apparatus, the message under the target topic by subscribing the topic.

Optionally, sending, by the intermediate apparatus, the message under the target topic to the central control apparatus includes: forming, by the intermediate apparatus, a message queue with messages corresponding to the plurality of detection devices, and sending the message queue to the central control apparatus; receiving, by the central control apparatus, the environmental information includes: extracting, by the central control apparatus, the environmental information detected by the plurality of detection devices from the message queue.

In some embodiments, the apparatus state information includes online state information of the detection devices, which indicates whether communication links between the detection devices and the central control apparatus are disconnected; and acquiring, by the central control apparatus, the apparatus state information of the stage apparatuses includes: determining, by the central control apparatus, the online state information of the detection devices based on the received message queue.

In some embodiments, the apparatus state information includes abnormality information of at least one of the detection devices and the stage apparatuses; acquiring, by the central control apparatus, the apparatus state information of the at least one of the stage apparatuses and the detection devices includes: determining, by the central control apparatus, that an offline apparatus is abnormal in a case that an offline duration of the offline apparatus exceeds an offline duration threshold or a number of reconnections of an offline apparatus exceeds a threshold of reconnections, wherein the offline apparatus is the detection device or the stage apparatus.

Optionally, the stage apparatuses include a play control apparatus and a display apparatus, wherein the play control apparatus is configured to control a play content of the display apparatus; and the method further includes: receiving, by the central control apparatus, a program playing list sent by the play control apparatus; and presenting, by the presentation apparatus, the program playing list.

Optionally, the method further includes: sequentially sending, by the central control apparatus, a shutdown instruction to each of the stage apparatuses according to a set time interval in response to a shutdown operation, wherein different set time intervals correspond to different types of stage apparatuses; or, sending, by the central control apparatus, a shutdown instruction to each of the stage apparatuses in response to a shutdown operation, wherein the shutdown instruction indicates that each of the stage apparatuses shuts down according to a respective set delay, different delays corresponding to different types of stage apparatuses; or, sending, by the central control apparatus, a first shutdown instruction to the intermediate apparatus in response to a shutdown operation, wherein the intermediate apparatus is configured to send a second shutdown instruction to each of the corresponding stage apparatuses according to delays for different types of stage apparatuses, different delays corresponding to different types of stage apparatuses.

The embodiments of the present disclosure further provide an apparatus for monitoring a stage, including a processor and a memory; wherein the memory is configured to store a computer program, and the processor is configured to execute the computer program in the memory, such that the steps executed by the central control apparatus or the steps executed by the intermediate apparatus in any one of the foregoing methods for monitoring the stage are achieved.

The embodiments of the present disclosure further provide a computer-readable storage medium, including at least one instruction, and the at least one instruction, when executed by the processor, performs the steps performed by the central control apparatus or the steps performed by the intermediate apparatus in any one of the foregoing methods for monitoring the stage.

The embodiments of the present disclosure further provide a computer program product, including a computer program; and the computer program, when executed by the processor, achieves the steps performed by the central control apparatus or the steps performed by the intermediate apparatus in any one of the foregoing methods for monitoring the stage.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and those of ordinary skill in the art can still derive other drawings from these accompanying drawings without creative efforts.

DETAILED DESCRIPTION

To make the objectives, technical solutions, and advantages of the present disclosure clearer, embodiments of the present disclosure will be described in detail with reference to the accompanying drawings.

For facilitating the understanding of the embodiments of the present disclosure, stage apparatuses are briefly described below. At present, there are many different types of stage apparatuses on large stages, such as lighting apparatuses, audio apparatuses, display apparatuses, stage machinery apparatuses, smoke machines, and the like.

The lighting apparatuses are configured to generate lighting effects, and include various colors of spot lamps, dome lamps, and the like. The audio apparatuses are configured to play various sounds, such as background music, accompaniments, voice-over, and the like. The display apparatuses are configured to display various stage pictures and the like. The display apparatuses include at least one of ground screens and riser screens. The shapes, number, and positions of the ground screens and the riser screens are set according to the actual needs. The stage machinery apparatus is configured to control positions of each portion of the stage, for example, lifting, translating, or operating in other ways, the stage. The smoke machines are configured to generate smoke.

The number of each type of stage apparatuses and the positions of each of the stage apparatuses can be adjusted according to the actual needs. By controlling these stage apparatuses, a required stage effect is generated.

Due to a complex stage environment, the stage apparatuses are prone to being in failures. Therefore, the embodiments of the present disclosure provide a system for monitoring a stage. The system for monitoring the stage is configured to monitor the environment where at least part of the stage apparatuses are located in real time and display monitored environmental information in real time, such that a normal operation of the stage apparatus is ensured; and performance accidents caused by the failures of the stage apparatuses are avoided.

Figure 1:
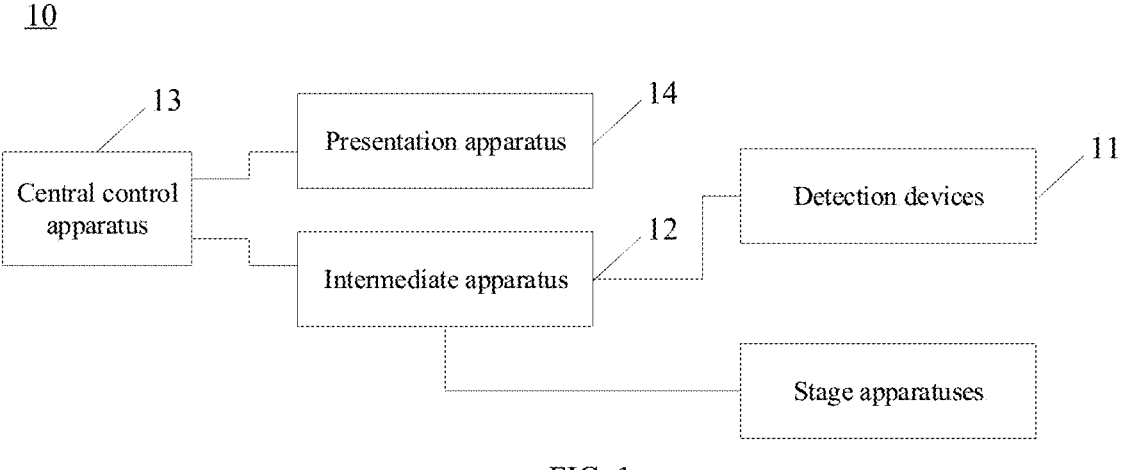
FIG. 1 is a schematic structural diagram of a system for monitoring a stage according to embodiments of the present disclosure.

FIG. 1 is a schematic structural diagram of a system for monitoring a stage according to embodiments of the present disclosure. The system for monitoring the stage can monitor and present environmental information and apparatus state information of stage apparatuses in real time. As shown in FIG. 1, the system for monitoring the stage includes: a plurality of detection devices 11, a central control apparatus 13, and a presentation apparatus 14. The plurality of detection devices 11 are configured to detect the environmental information of an environment where at least part of the stage apparatuses are located in real time, and to send the detected environmental information. The central control apparatus 13 is communicatively connected to the plurality of detection devices 11 for receiving the environmental information sent by an intermediate apparatus 12. The central control apparatus 13 is connected to the at least part of the stage apparatuses and the presentation apparatus 14 respectively, and configured to acquire apparatus state information of at least one of the stage apparatuses and the detection devices, and to present the environmental information and the apparatus state information through the presentation apparatus 14.

The environmental information of the at least part of the stage apparatuses is detected by the detection devices in real time, and then sent to the central control apparatus. Therefore, the control apparatus can present the environmental information through a presentation apparatus for staff to observe the environmental information of the stage apparatuses in real time, and find out the stage apparatuses that may be or have been in a failure in time, such that performance accidents due to the failures of the stage apparatuses are avoided. Meanwhile, the central control apparatus is further configured to acquire the apparatus state information of at least one of the stage apparatuses and the detection devices, and to present the apparatus state information through the presentation apparatus. Therefore, the staff is convenient to further master apparatus states of the stage apparatuses or the detection devices, such that performance accidents are further avoided.

The plurality of detection devices 11 are arranged at suitable positions in the stage, such as in the vicinity of stage apparatuses to be detected and the like. The positions of the detection devices 11 may be set according to the actual needs.

Exemplarily, the detection devices 11 include at least one of a temperature sensor, a humidity sensor, and a smoke sensor. The temperature sensor is configured to detect a temperature to prevent the stage apparatuses from overheating. The humidity sensor is configured to detect humidity to prevent the stage apparatuses from being soaked with water. The smoke sensor is configured to detect a smoke amount.

In some embodiments, the detection devices 11 include the temperature sensor, the humidity sensor, and the smoke sensor. Generally, the temperature and the humidity are important factors affecting normal operations of the stage apparatuses. Therefore, the temperature and the humidity of the environment where the stage apparatuses are located are detected in real time, such that whether the stage apparatuses are in failures is conveniently determined.

In some embodiments, as shown in FIG. 1, the system for monitoring the stage further includes the intermediate apparatus 12. The detection devices 11 first send the detected environmental information to the intermediate apparatus 12, and the intermediate apparatus 12 forwards the environmental information to the central control apparatus 13.

It should be noted that, in other embodiments, the detection devices 11 are connected to the central control apparatus 13 through a wired or wireless connection, and directly send the detected environmental information to the central control apparatus 13.

In some embodiments, the intermediate apparatus 12 is disposed at a stage site, and may be a remote terminal unit (RTU). The RTU is a special computer measurement and control unit with a modular structure, designed for a long communication range and a severe industrial field environment. The RTU has functions of remote data collection, control, and communication, and can receive the apparatus control instruction from the central control apparatus and control actions of the stage apparatuses and the like.

In some embodiments, the intermediate apparatus 12 is configured to convert the message format of the environmental information sent by the detection devices 11, and then to send the environmental information subjected to message format conversion to the central control apparatus 13. Through format conversion on the environmental information by the intermediate apparatus 12, the detection devices 11 from different manufacturers are compatible with the environmental information, such that the cost of the system for monitoring the stage is reduced.

Exemplarily, the intermediate apparatus 12 is configured to convert the environmental information detected by a target detection device to a message under a target topic, wherein the target detection device is any one of the plurality of detection devices, the target topic is a topic corresponding to the target detection device, and different topics correspond to different detection devices; and to send the message under the target subject.

In the embodiments of the present disclosure, the central control apparatus 13 acquires the message under the target topic by subscribing the topic, so as to acquire the environmental information detected by each of the detection devices 11.

Here, the topic may be set according to an actual application scenario. The topic may take a form of an intermediate apparatus identifier/report/detection device identifier. For example, the intermediate apparatus sends the environmental information detected by a sensor 1 under a topic "rtu/report/sensor1", and sends the environmental information detected by a sensor 2 under the a topic "rtu/report/sensor2". The sensor 1 and sensor 2 may be sensors of the same type or different types.

In some embodiments, all the environmental information sent by the RTU adopts a topic of rtu/report/beginning, such that the central control apparatus 13 acquires all the environmental information by subscribing the topic "rtu/report/#", wherein # is a multi-level wildcard, indicating subscription of all topics of rtu/report/beginning.

In other embodiments, the central control apparatus 13 individually subscribes the topics corresponding to each detection device, such that all the environmental information is acquired.

Exemplarily, the intermediate apparatus 12 and the central control apparatus 13 communicate with each other based on a message queuing telemetry transport (MQTT) protocol. The MQTT protocol is a client-server-based message publish/subscribe transport protocol, and has the advantages of light weight, simpleness, openness, and easiness in implementation.

In the embodiments of the present disclosure, the intermediate apparatus 12 is configured to form a message queue with messages corresponding to the plurality of detection devices, and to send the message queue to the central control apparatus; and the central control apparatus 13 is configured to extract the environmental information detected by the plurality of detection devices from the message queue.

Exemplarily, the intermediate apparatus 12 may periodically acquire the environmental information sent by each of the detection devices 11, followed by conversion on the message format of the environmental information to acquire a message under a corresponding topic, then form the message queue with the messages of each of the detection devices, and finally send the message queue to the central control apparatus 13. As described above, since different detection devices 11 correspond to different topics, upon receiving the message queue, the central control apparatus 13 acquires the environmental information corresponding to each sensor according to the topics in the topic message.

In some embodiments, the message queue may be ordered by the identifiers of the sensors in the topics, for example, the message queue may be in the following form: {rtu/report/sensor1/a1; rtu/report/sensor2/a2; . . . rtu/report/sensorN/aN}, wherein a1 represents data corresponding to the environmental information detected by the sensor 1; . . . aN represents data corresponding to the environmental information detected by a sensor N. N is a positive integer greater than 1.

In the embodiments of the present disclosure, the intermediate apparatus 12 sends the message queue to the central control apparatus 13 at a set time interval. The set time interval may be preset prior to the system for monitoring the stage operates. A specific value may be set according to a network state and a requirement for refreshing data of the presentation apparatus in real time, for example, may be set as 1 S, 2 S, and the like.

The intermediate apparatus 12 sends the message queue at the set time interval, and thus, the central control apparatus 13 can receive the message queue periodically. The central control apparatus 13 controls the presentation apparatus 14 to refresh the corresponding environmental information once every time acquiring the message queue, such that the environmental information detected by the detection devices in real time is presented.

In the embodiments of the present disclosure, in the case that each of the detection devices 11 operates normally, the message queue sent by the intermediate apparatus 12 each time may include messages corresponding to each of the detection devices, such that real-time refreshing of the environmental information presented by the presentation apparatus 14 is ensured.

In some embodiments, the apparatus state information includes at least one of online state information of the detection devices and online state information of the stage apparatuses. The online state information of the detection devices indicates whether the communication links between the detection devices and the central control apparatus are disconnected. The online state information of the stage apparatuses indicates whether communication links between the stage apparatuses and the central control apparatus are disconnected. That is, the central control apparatus is further configured to online monitor at least one of the stage apparatuses and the detection devices to acquire online state information, and to present the online state information through the presentation apparatus.

Exemplarily, in the case that the apparatus state information includes the online state information of the detection devices, the central control apparatus determines whether the detection devices are online based on the received message queue, such that the online state information of the detection devices is acquired. The central control apparatus stores the identifiers of all the detection devices, compares the identifiers of the detection devices corresponding to each of the messages in the received message queue with the stored identifiers of the detection devices, and determines whether the message corresponding to each of the detection devices presents in the message queue according to a comparison result, such that the online state information of the detection devices is acquired. The central control apparatus performs a comparison once receiving one message queue.

In the case that the messages corresponding to the detection devices are present in the message queue, the central control apparatus determines that the detection devices are online.

In the case that the messages corresponding to the detection devices are not present in the message queue, the central control apparatus counts a duration that the messages corresponding to the detection devices are not present in the message queue and/or counts a number of times that the messages corresponding to the detection devices are not acquired in the message queue continuously. In the case that the duration that the messages corresponding to the detection devices are not present in the message queue exceeds a set duration and/or the number of times that the messages corresponding to the detection devices are not acquired in the message queue continuously exceeds a set number of times (for example, one time and the like), the central control apparatus determines that the detection devices are offline.

Exemplarily, in the case that the apparatus state information includes the online state information of the detection devices, the central control apparatus may determine whether the stage apparatuses are online based on the received heartbeat messages. In the embodiments of the present disclosure, the central control apparatus is connected to a stage control apparatus through a network, and the stage control apparatus periodically sends the heartbeat messages to the central control apparatus. In the case that the duration that the central control apparatus does not receive the heartbeat message of a certain stage control apparatus exceeds a set duration and/or the number of times that the central control apparatus does not receive the heartbeat message of the certain stage control apparatus continuously exceeds a set number of times (for example, one time and the like), the central control apparatus determines that the stage control apparatus is offline.

Here, the stage control apparatus is, for example, a display control apparatus for controlling the display apparatus, a lighting control apparatus for controlling the lighting apparatus, or the like. The stage control apparatus may be an independent computer device, or may be integrated to the corresponding stage apparatus.

In some embodiments, the presentation apparatus 14, in presenting the apparatus state information, may present at least one of: the identifiers of the online apparatuses, the number of each type of online apparatuses, the identifiers of offline apparatuses, and the number of each type of offline apparatuses.

Optionally, in some embodiments, the central control apparatus 13 is further configured to initiate a connection request to an offline apparatus in a case that an offline duration of the offline apparatus reaches an offline duration threshold. The connection request is configured to request the offline apparatus to reestablish the connection. By automatically sending the connection request in response to reaching an offline duration threshold, the condition that the apparatus is offline accidentally can be eliminated.

The offline duration threshold may be set according to the actual needs. For avoiding frequent reconnection initiation, the offline duration threshold may be set longer, e.g., 20 min, 30 min, and the like.

Alternatively, in other embodiments, the central control apparatus 13 is further configured to repeatedly send the connection request to the offline apparatus until the number of times of initiating the connection request reaches a first threshold of reconnections, or, the offline apparatus is back online. Here, a time interval for repeatedly sending the connection request may be 3 s, 5 s, 10 s, 30 s, or the like. The first threshold of reconnections may be set according to the actual needs, for example, 3 times, 5 times, and the like.

In the case that the number of times that the central control apparatus 13 sends the connection request to the offline apparatus reaches the first threshold of reconnections, and the offline apparatus is still in the offline state, the central control apparatus 13 suspends initiating the reconnection request. The central control apparatus 13 reinitiates the connection request to the offline apparatus until the offline duration threshold is reached. Therefore, the timeliness of connection is considered, and frequent reconnection initiation is also avoided.

Here, the offline duration refers to a duration acquired by the central control apparatus, timing from determining the apparatus being offline.

Optionally, in the case that the number of reconnections of the offline apparatus reaches the first threshold of reconnections, the central control apparatus 13 is further configured to output alarm information through the presentation apparatus 14. The alarm information is configured to prompt that the offline apparatus cannot be connected. For example, a pop-up window, status bar notification, or the like may be displayed on the interface of the presentation apparatus 14. Therefore, the staff is convenient to find an abnormality in time, and positions and solves the problem as soon as possible.

In some embodiments, the central control apparatus determines that the offline apparatus is abnormal in the case that the number of reconnections of the offline apparatus reaches a second threshold of reconnections and/or the offline duration reaches a duration threshold. Here, the second threshold of reconnections may be greater than the first threshold of reconnections, for example, greater than the first threshold of reconnections by 1, or 2 times greater than the first threshold of reconnections.

In the embodiments of the present disclosure, the central control apparatus is further configured to determine whether the environmental information in the messages corresponding to the detection devices exceeds a set range, and to determine that a detection device corresponding to the environmental information exceeding the set range is abnormal. The set range is a maximum measurement range supported by the detection devices or a numerical range in which the environmental information may be present.

Optionally, the central control apparatus is further configured to count a number of abnormalities of at least one of the stage apparatuses and the detection devices, wherein the number of abnormalities may be a total number of abnormalities of the apparatuses upon the system is powered on, or a total number of abnormalities of the apparatuses in a set time period. In the case that the number of abnormalities exceeds a threshold of abnormalities, the presentation apparatus is controlled to output the alarm information. The alarm information is configured to prompt that the apparatus with the number of abnormalities exceeding the threshold of abnormalities is possibly in a failure.

In some embodiments, the stage apparatuses further include a play control apparatus. The central control apparatus 13 is connected to the play control apparatus (not shown), and configured to receive a program playing list sent by the play control apparatuses, and to present the program playing list through the presentation apparatus 14.

Exemplarily, the program playing list presented by the presentation apparatus 14 includes: display apparatus names, program names (e.g., media names), and play times (including start times and end times).

The stage apparatuses usually include a plurality of display apparatuses, each of which is controlled by a different play control apparatus; the central control apparatuses may centralizedly present play contents of each of the display apparatuses by acquiring the program playing lists sent by play control apparatuses and centralizedly presenting the received program playing lists through the presentation apparatus, for convenience in centralized check of the play contents and avoidance in errors of the play contents.

In some embodiments, the play control apparatuses may send the program playing lists to the central control apparatus through a transmission control protocol/Internet protocol (TCP/IP).

Optionally, the central control apparatus 13 is further configured to present, by the presentation apparatus 14, at least one of the following contents: a stage model, an operation state of the central control apparatus, the number of abnormalities of the stage apparatuses, a countdown for a target performance events, and energy consumption information of the stage apparatuses. In some embodiments, the stage model may be a real-time simulation model that may vary according to the actual actions of the stage apparatuses, for example, the light strengthening, and the like.

Exemplarily, the operation state of the central control apparatus includes at least one of: a central processing unit (CPU) occupancy rate, a memory occupancy rate, a storage space occupancy rate, and a graphics processing unit (GPU) usage rate; and the operation state of the central control apparatus is monitored. The number of abnormalities of the stage apparatuses include a number of offlines and a number of other abnormalities. The energy consumption information of the stage apparatuses includes a total power of the stage apparatuses, an accumulated consumed electric quantity, and the like. The countdown for the target performance event facilitates timing for performance personnel. The energy consumption information of the stage apparatuses is convenient for collecting historical data and transversely comparing overall states of the apparatuses.

Figure 2:
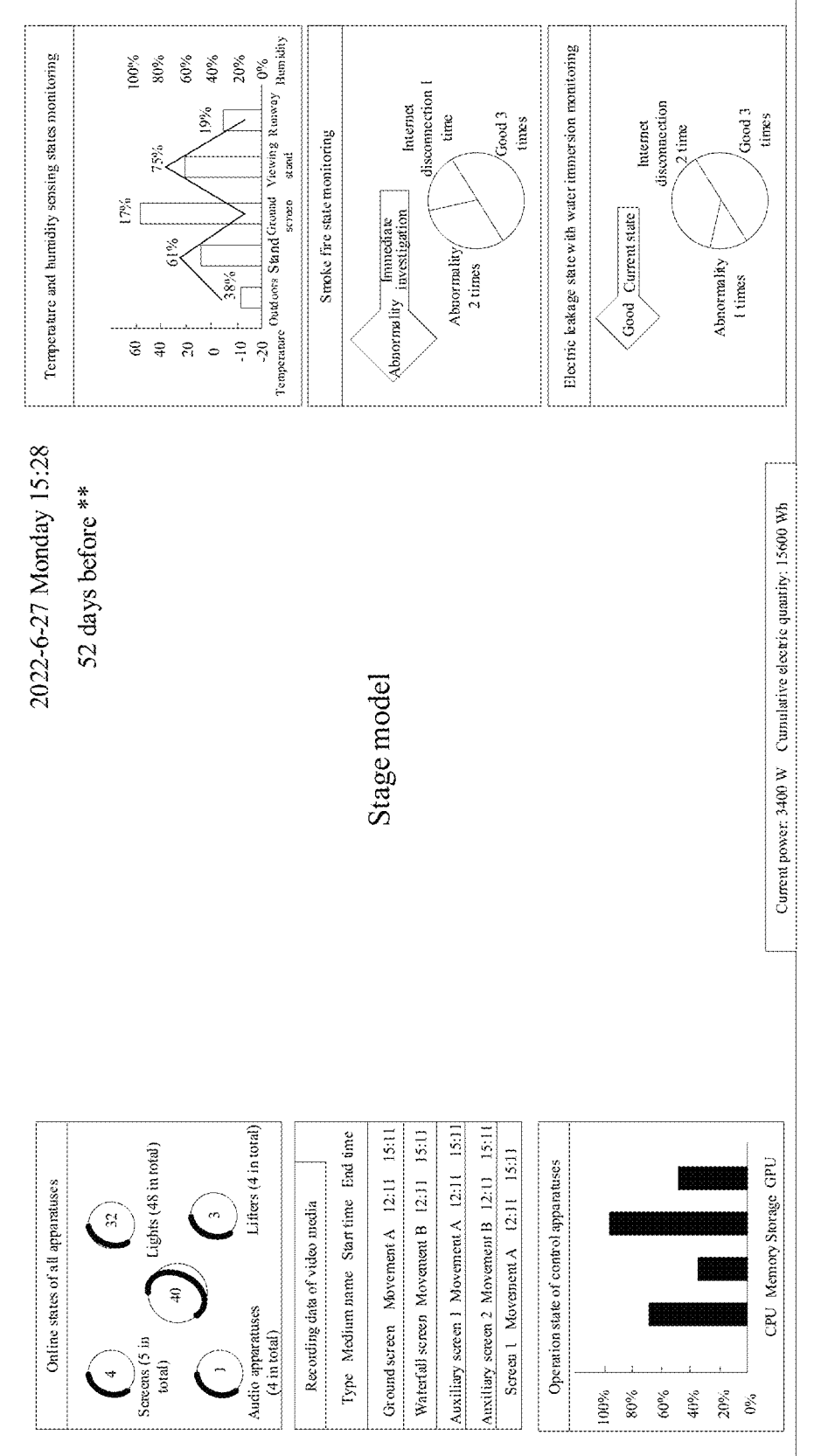
FIG. 2 is a schematic diagram of a display interface according to embodiments of the present disclosure.

FIG. 2 is a schematic diagram of a presentation interface of a presentation apparatus according to embodiments of the present disclosure. As shown in FIG. 2, the presentation interface includes a central region and a plurality of peripheral regions. The plurality of peripheral regions are disposed on two sides of the central region. The central region is configured to present the stage model. The edge (for example, upper right corner) of the center region is configured to present the countdown for the target performance event. The bottom of the central region is configured to present the energy consumption information of the stage apparatuses.

Each peripheral region is configured to present a type of information. For example, in a top-to-bottom order, the first peripheral region on the left side is configured to present information of online apparatuses; the second peripheral region on the left side is configured to present the program playing list; the third peripheral region on the left side is configured to present the operation state of the central control apparatus; the first peripheral region on the right side is configured to present detection information of the temperature sensor and the humidity sensor; the second peripheral region on the right side is configured to present detection information of the smoke sensor; and the third peripheral region on the left side is configured to present apparatus abnormality information caused by water immersion.

It should be noted that a relationship between each peripheral region and the presented information in FIG. 2 is only illustrative, and may be adjusted as needed.

Optionally, the presentation apparatus 14 is further configured to provide a control interface for the stage apparatuses; and the central control apparatus 13 is further configured to send an apparatus control instruction for the target stage apparatus according to a control operation on the control interface.

Exemplarily, the apparatus control instruction includes an on instruction, an off instruction, a brightness adjusting instruction, and the like for the lighting apparatus, an on instruction, an off instruction, and the like for the display apparatus, an on instruction, an off instruction, and a sound volume adjusting instruction, and the like for the audio apparatus, an on instruction, an off instruction, an ascending instruction, a descending instruction, a pause instruction, and the like for the stage lifting apparatus, an on instruction, an off instruction, a smoke volume adjusting instruction, and the like for the smoke machine, which may be one or more of these instructions.

The control interface includes a plurality of stage apparatuses and a control corresponding to each of the stage apparatuses, and the plurality of stage apparatuses include at least one of the lighting apparatuses, the display apparatuses, the audio apparatuses, the stage lifting apparatuses, and the smoke machines.

The controls for the plurality of stage apparatuses are presented in one control interface, namely, all the stage apparatuses are controlled in a primary menu mode, such that an interactive interface is friendly; and by controlling the corresponding stage apparatuses through the controls, the operation mode is simple and convenient.

Exemplarily, a plurality of control regions are included in the control interface. Each control region corresponds to one type of stage apparatuses, and one or more stage apparatuses may be present for each type. The control region for each type of stage apparatuses includes a plurality of sub-control regions, each of which corresponds to one stage apparatus. Exemplarily, each sub-control region includes a name of the stage apparatus, a current state of the stage apparatus, and a control corresponding to the stage apparatus. The controls include at least one of slider controls and option controls.

For example, in response to five lighting apparatuses, the control region corresponding to the lighting apparatuses includes five sub-control regions, each of which corresponds to one lighting apparatus. The brightness of the lighting apparatus 1 is controlled by sliding the slider control in the sub-control region for the lighting apparatus 1.

For another example, in response to eight audio apparatuses, the control region corresponding to the audio apparatuses includes eight sub-control regions, each of which corresponds to one audio apparatus. The sound volume of the audio apparatus 1 is controlled by sliding the slider control in the sub-control region for the audio apparatus 1.

For another example, in response to three stage lifting apparatuses, the control region corresponding to the stage lifting apparatuses includes three sub-control regions, each of which corresponds to one stage lifting apparatus. The stage lifting apparatus 1 is controlled to lift up and down by clicking an option control in the sub-control region for the stage lifting apparatus 1.

The apparatus control instruction includes a centralized control instruction and a single-path control instruction. The centralized control instruction is configured to control a plurality of stage apparatuses of a same category, for example, to control all the lighting apparatuses to dim down, to control all the audio apparatuses to tune down, and the like. The single-path control instruction is configured to control one of the corresponding stage apparatuses, for example, to shut down a certain lighting apparatus, or to control a certain stage lifting apparatus to ascend, and the like.

The centralized control instruction and the single-path control instruction carry type indication information which is configured to indicate a type of the apparatus control instruction.

Figure 3:
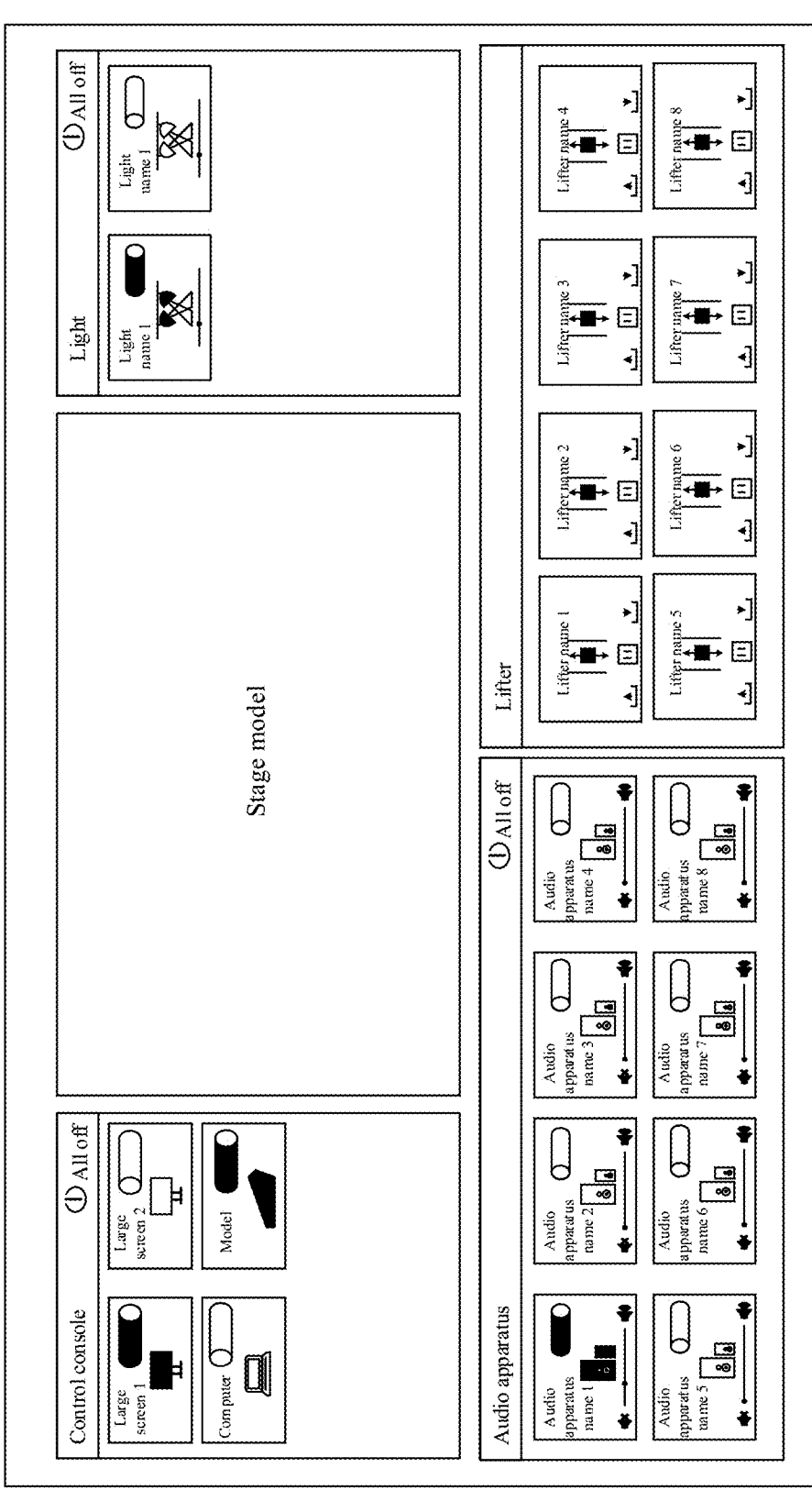
FIG. 3 is a schematic diagram of a control interface according to embodiments of the present disclosure.

FIG. 3 is a schematic diagram of a control interface according to embodiments of the present disclosure. As shown in FIG. 3, the control interface includes a main control region (i.e., a console), a light control region, a sound control region, and a lifter control region. Each control region includes a plurality of control sub-regions for the plurality of stage apparatuses.

The stage apparatuses are controlled through a visual screen operation interface, featuring a friendly interaction interface and convenience in control.

In some embodiments, two presentation apparatuses 14 are provided, one for providing the presentation interface and the other for providing the control interface. In other embodiments, one presentation apparatus may provide both the presentation interface and the control interface.

Exemplarily, the presentation apparatus 14 may be a display having a large screen to facilitate displaying all the contents that need to be displayed.

In some embodiments, the system for monitoring the stage also has a push-to-shutdown function, that is, all the stage apparatuses are shut down through a one-key operation. For example, a push-to-shutdown control is provided on the control interface. For avoiding an excessively high instantaneous voltage due to shutdown of a large number of stage apparatuses, followed by damages on a part of the stage apparatuses, in the case that the central control apparatus receives a push-to-shutdown operation, the stage apparatuses may be shut down in batch by any one of the following modes.

In the first mode, the central control apparatus is configured to sequentially send, in response to a shutdown operation (also called the push-to-shutdown operation), a shutdown instruction to each of the stage apparatuses according to a set time interval, wherein different set time intervals correspond to different types of stage apparatuses.

In the second mode, the central control apparatus is configured to send, in response to a shutdown operation, a shutdown instruction to each of the stage apparatuses, wherein the shutdown instruction indicates that each of the stage apparatuses shuts down according to a respective set delay, different delays corresponding to different types of stage apparatuses.

In the third mode, the central control apparatus is configured to send, in response to a shutdown operation, a first shutdown instruction to the intermediate apparatus, wherein the intermediate apparatus is configured to send a second shutdown instruction to each of the corresponding stage apparatuses according to delays for different types of stage apparatuses, different delays corresponding to different types of stage apparatuses.

In the embodiments of the present disclosure, different delays correspond to different types of stage apparatuses, for example, the delay corresponding to the display apparatus is 5 s; the delay corresponding to the lighting apparatus is 10 s; and the delay corresponding to the audio apparatus is 15 s, and the like. A specific value for each delay may be set according to the actual needs, which is not limited in the present disclosure.

The first and third modes, in which the stage apparatuses do not need to be changed, are prone to achieving.

It should be noted that, in the above three modes, the stage apparatuses are shut down by batch according to the type, such that the shutdown efficiency is ensured, and the stage apparatuses are further protected. In other embodiments, the stage apparatuses may be shut down one by one; that is, each of the stage apparatuses corresponds to a different delay.

Figure 4:
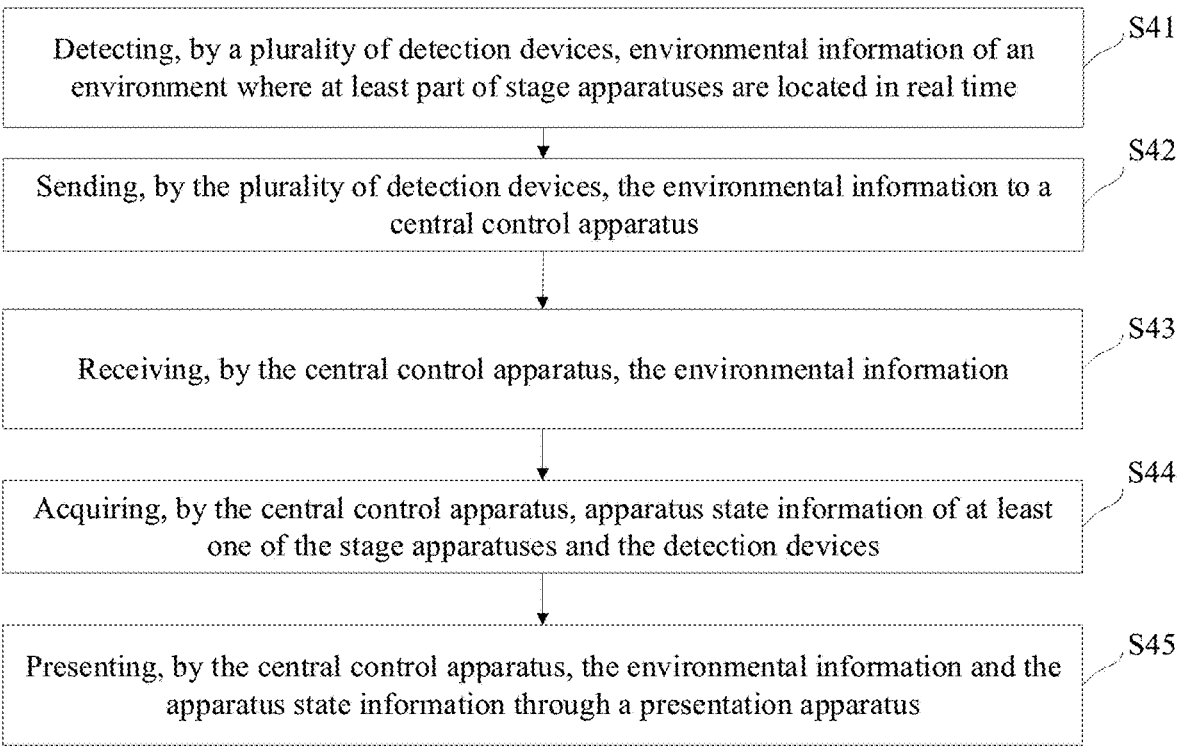
FIG. 4 is a flowchart of a method for monitoring a stage according to embodiments of the present disclosure.

The embodiments of the present disclosure further provide a method for monitoring the stage. As shown in FIG. 4, the method includes:

S41, detecting, by a plurality of detection devices, environmental information of an environment where at least part of stage apparatuses are located in real time;

S42, sending, by the plurality of detection devices, the environmental information to a central control apparatus;

S43, receiving, by the central control apparatus, the environmental information;

S44, acquiring, by the central control apparatus, apparatus state information of at least one of the stage apparatuses and the detection devices; and S45, presenting, by the central control apparatus, the environmental information and the apparatus state information through a presentation apparatus.

Here, S43 and S44 may be executed sequentially or synchronously.

In some embodiments, S42 includes: sending, by the plurality of detection devices, the environmental information to an intermediate apparatus; converting, by the intermediate apparatus, the environmental information detected by a target detection device to a message under a target topic, wherein the target detection device is any one of the plurality of detection devices, the target topic is a topic corresponding to the target detection device, and different topics correspond to different detection devices; sending, by the intermediate apparatus, the message under the target topic to the central control apparatus; and acquiring, by the central control apparatus, the message under the target topic by subscribing the topic.

In some embodiments, sending, by the intermediate apparatus, the message under the target topic to the central control apparatus includes: forming, by the intermediate apparatus, a message queue with messages corresponding to the plurality of detection devices, and sending the message queue to the central control apparatus; and receiving, by central control apparatus, the environmental information includes: extracting, by the central control apparatus, the environmental information detected by the plurality of detection devices from the message queue.

Optionally, the apparatus state information includes at least one of online state information of the detection devices, abnormality information of the detection devices, online state information of the at least part of the stage apparatuses, and abnormality information of the at least part of the stage apparatuses.

In the case that the apparatus state information includes the online state information of the detection devices, the central control apparatus determines the online state information of the detection devices based on the received message queue. In the case that the apparatus state information includes the online state information of the stage apparatuses, the central control apparatus determines the online state information of the at least part of the stage apparatuses based on received heartbeat messages. In the case that the apparatus state information includes abnormality information of at least one of the detection devices and the stage apparatuses, the central control apparatus determines, in the case that an offline duration of an offline apparatus exceeds an offline duration threshold or a number of reconnections of an offline apparatus exceeds a threshold of reconnections, that the offline apparatus is abnormal, wherein the offline apparatus is the detection device or the stage apparatus.

Optionally, the stage apparatuses include a play control apparatus and a display apparatus, wherein the play control apparatus is configured to control a play content of the display apparatus. The method further includes: receiving, by the central control apparatus, a program playing list sent by the play control apparatus; and presenting, the presentation apparatus, the program playing lists.

In some embodiments, the method further includes: sequentially sending, by the central control apparatus, a shutdown instruction to each of the stage apparatuses according to a set time interval in response to a shutdown operation, wherein different set time intervals correspond to different types of stage apparatuses.

In other embodiments, the method further includes: sending, by the central control apparatus, a shutdown instruction to each of the stage apparatuses in response to a shutdown operation, wherein the shutdown instruction indicates that each of the stage apparatuses shuts down according to a respective set delay, different delays corresponding to different types of stage apparatuses.

In still other embodiments, the method further includes: sending, by the central control apparatus, a first shutdown instruction to the intermediate apparatus in response to a shutdown operation, wherein the intermediate apparatus is configured to send a second shutdown instruction to each of the corresponding stage apparatuses according to delays for different types of stage apparatuses, different delays corresponding to different types of stage apparatuses.

It should be noted that the method for monitoring the stage and the foregoing system for monitoring the stage belong to the same concept, and for related contents, reference may be made to the foregoing system for monitoring the stage, and detailed description is omitted here.

Figure 5:
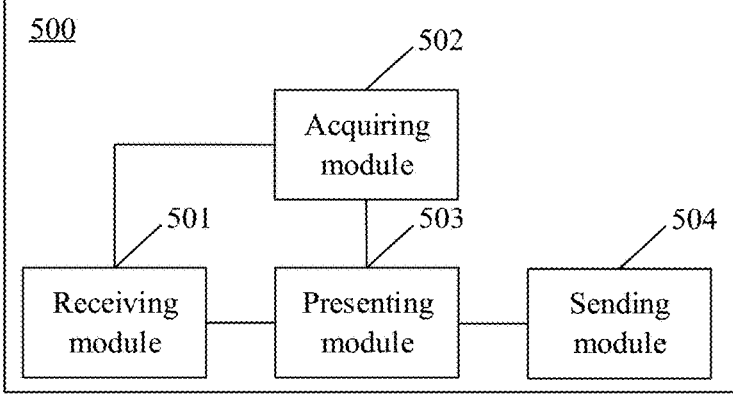
FIG. 5 is a schematic structural diagram of an apparatus for monitoring a stage according to embodiments of the present disclosure.

The embodiments of the present disclosure further provide an apparatus for monitoring a stage. The apparatus for monitoring the stage may be the foregoing central control apparatus. As shown in FIG. 5, the apparatus for monitoring the stage 500 includes: a receiving module 501, an acquiring module 502, and a presenting module 503. The receiving module 501 is configured to receive environmental information, wherein the environmental information, detected by a plurality of detection devices in real time, is the environmental information of an environment where at least part of stage apparatuses are located. The acquiring module 502 is configured to acquire apparatus state information of at least one of the stage apparatuses and the detection devices. The presenting module 503 is configured to present the environmental information and the apparatus state information through a presentation apparatus.

In some embodiments, the receiving module 501 is configured to acquire a message under a target topic by subscribing the topic, wherein the message under the target topic is acquired by converting, by the intermediate apparatus, environmental information detected by a target detection device, the target detection device is any one of the plurality of detection devices, the target topic is a topic corresponding to the target detection device, and different topics correspond to different detection devices.

In some embodiments, the receiving module 501 is configured to extract the environmental information detected by the plurality of detection devices from a received message queue, wherein the message queue is formed by messages corresponding to the plurality of detection devices by the intermediate apparatus.

In some embodiments, the acquiring module 502 is configured to determine online state information of the detection devices based on the received message queue. For example, an identifier of a detection device corresponding to each message in the received message queue is compared with a stored identifier of the detection device; and the online state information of the detection device is determined according to a comparison result.

In some embodiments, the acquiring module 502 is configured to determine online state information of the at least part of the stage apparatuses based on the received heartbeat message.

In other embodiments, the acquiring module 502 is configured to determine, in a case that an offline duration of an offline apparatus exceeds an offline duration threshold or a number of reconnections of an offline apparatus exceeds a threshold of reconnections, that the offline apparatus is abnormal, wherein the offline device is the detection device or the stage apparatus.

Optionally, the receiving module 501 is further configured to receive a program playing list sent by the play control apparatus, and to present the program playing list through the presentation apparatus.

Optionally, the device further includes a sending module 504. The sending module 504 is configured to send an apparatus control instruction to a target stage apparatus, wherein the apparatus control instruction is sent by the central control apparatus based on a control operation on a control interface of the stage apparatus; and the control interface is provided by the presentation apparatus.

Optionally, the sending module 504 is configured to sequentially send, in response to a shutdown operation, a shutdown instruction to each of the stage apparatuses according to a set time interval, wherein different set time intervals correspond to different types of stage apparatuses; or, the sending module 504 is configured to send, in response to a shutdown operation, a shutdown instruction to each of the stage apparatuses, wherein the shutdown instruction indicates that each of the stage apparatuses shuts down according to a respective set delay, different delays corresponding to different types of stage apparatuses; or, the sending module 504 is configured to send, in response to a shutdown operation, a first shutdown instruction to the intermediate apparatus, such that the intermediate apparatus sends a second shutdown instruction to each of the corresponding stage apparatuses according to delays for different types of stage apparatuses.

Figure 6:
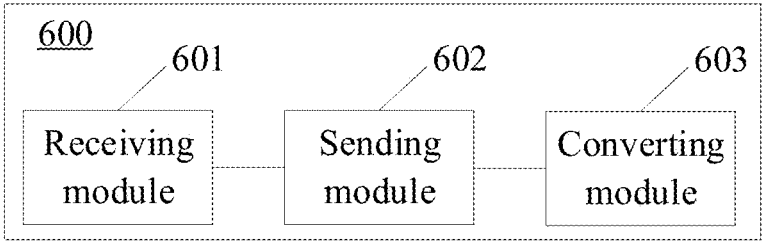
FIG. 6 is a schematic structural diagram of another apparatus for monitoring a stage according to embodiments of the present disclosure.

The embodiments of the present disclosure further provide an apparatus for monitoring a stage. The apparatus for monitoring the stage may be the foregoing intermediate apparatus. As shown in FIG. 6, the apparatus for monitoring the stage 600 includes: a receiving module 601 and a sending module 602. The receiving module 601 is configured to receive environmental information sent by a plurality of detection devices, wherein the environmental information, detected by a plurality of detection devices in real time, is the environmental information of an environment where at least part of stage apparatuses are located. The sending module 602 is configured to send the environmental information to a central control apparatus, such that the central control apparatus presents the environmental information through a presentation apparatus.

Optionally, the device further includes a converting module 603, configured to convert the environmental information detected by a target detection device to a message under a target topic, wherein the target detection device is any one of the plurality of detection devices, the target topic is a topic corresponding to the target detection device, and different topics correspond to different detection devices; and the sending module 602 is configured to send the message under the target topic.

Optionally, the converting module 603 is further configured to form a message queue with messages corresponding to the plurality of detection devices; and the sending module 602 is configured to send the message queue to the central control apparatus.

Optionally, the method further includes: the receiving module 601 is further configured to receive a first shutdown instruction sent by the central control apparatus; and the sending module 602 is further configured to send a second shutdown instruction to each of the corresponding stage apparatuses according to delays for different types of stage apparatuses, wherein different delays correspond to the different types of stage apparatuses. The first shutdown instruction indicates that all the stage apparatuses are shut down.

It should be noted that, upon stage monitoring of the apparatus for monitoring the stage according to the above embodiments, illustration is made with a division of various function modules merely. In practice, the above functions can be assigned to different functional modules for implementation as needed, that is, the internal structure of the apparatus can be divided into different functional modules, so as to implement all or a part of the above functions. In addition, the apparatus for monitoring the stage and the method for monitoring the stage according to the above embodiments belong to the same concept as the system embodiments, and the specific implementation process thereof is described in the method and system embodiments in detail, and is not repeated herein.

Figure 7:
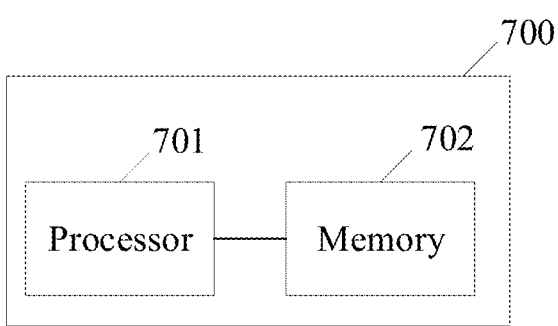
FIG. 7 is a schematic structural diagram of a device for monitoring a stage according to embodiments of the present disclosure.

FIG. 7 is a structural block diagram of a device for monitoring a stage according to embodiments of the present disclosure. A display driving apparatus may be a computer device, and the device for monitoring the stage 700 includes: a processor 701 and a memory 702.

The processor 701 may include one or more processing cores, such as a 5-core processor and an 8-core processor. The processor 701 may be implemented in at least one hardware form of a digital signal processor (DSP), a field-programmable gate array (FPGA), and a programmable logic array (PLA). The processor 701 may also include a main processor and a co-processor. The main processor is a processor configured to process data in an awake state, and is also referred to as a central processing unit (CPU). The co-processor is a low-power processor configured to process data in a standby state.

The memory 702 may include one or more computer-readable storage media, which may be non-transitory. The memory 702 may also include a high speed random access memory and a non-volatile memory, such as one or more magnetic disk storage devices and flash storage devices. In some embodiments, a non-transitory computer-readable storage medium in the memory 702 is configured to store at least one instruction for execution by the processor 701, so as to implement the steps performed by the central control apparatus in the method for monitoring the stage according to the embodiments of the present disclosure, or to implement the steps performed by the intermediate apparatus in the method for monitoring the stage according to the embodiments of the present disclosure.

Those skilled in the art should understand that the structure illustrated in FIG. 7 does not constitute limitation of the computer device 700, and the computer apparatus may include more or fewer components than those illustrated, or some of the components may be combined, or a different arrangement of components may be employed.

The embodiments of the present disclosure further provide a non-transitory computer-readable storage medium, wherein instructions in the storage medium, when executed by the processor of a computer device, enable the computer apparatus to perform steps performed by the central control apparatus in the method for monitoring the stage according to the embodiments of the present disclosure, or perform steps performed by the intermediate apparatus in the method for monitoring the stage according to the embodiments of the present disclosure.

The embodiments of the present disclosure further provide a computer program product, including a computer program/instruction, and when run/executed by the processor, the computer program/instruction performs steps performed by the central control apparatus in the method for monitoring the stage according to the embodiments of the present disclosure, or performs steps performed by the intermediate apparatus in the method for monitoring the stage according to the embodiments of the present disclosure.

Unless otherwise defined, technical or scientific terms used herein shall have the ordinary meaning as understood by those of ordinary skill in the art to which the present disclosure belongs. "First", "second", "third", and other similar words, as used in the specification and in the claims of the patent application of the present disclosure, do not indicate any order, quantity, or importance, but are merely defined to distinguish different components. Likewise, "a", "an", or other similar words does not indicate a limitation of quantity, but rather the presence of at least one. "Include", "comprise" or other similar words means that the elements or objects stated before "include" or "comprise" encompass the elements or objects and equivalents thereof listed after "include" or "comprise", but does not exclude other elements or objects.

The above does not limit the present disclosure in any way. Although the present disclosure has been described through the embodiments, they are not intended to limit the present disclosure. Those skilled in the art are able to make some changes or modifications to the above disclosed technical contents to give equivalent embodiments of equivalent changes without departing from the scope of the present disclosure. However, any simple alterations, equivalent changes and modifications made, without departing from the contents of the technical solutions of the present disclosure, on the above embodiments based on the technical essence of present disclosure shall fall within the scope of the technical solutions of the present disclosure.

What is claimed is:

1. A system for monitoring a stage, comprising: a plurality of sensors, a central control apparatus, and a display; wherein the plurality of sensors are configured to detect, in real time, environmental information of an environment where at least part of stage apparatuses are located, and to send the detected environmental information, wherein the stage apparatuses comprise at least one type of various colors of spot lamps, dome lamps, ground screens, riser screens, audio apparatuses, stage lifting apparatuses, or smoke machines; and the central control apparatus is connected to the at least part of the stage apparatuses and the display respectively, and configured to receive the environmental information, to acquire apparatus state information of at least one of the stage apparatuses and the sensors, and to present the environmental information and the apparatus state information through the display; and the system for monitoring the stage further comprises an intermediate apparatus, wherein the intermediate apparatus is configured to convert environmental information detected by a target sensor to a message under a target topic, wherein the target sensor is any one of the plurality of sensors, the target topic is a topic corresponding to the target sensor, and different topics correspond to different sensors; and to send the message under the target topic; and the central control apparatus is configured to acquire the message by subscribing the topic to receive the environmental information; and the intermediate apparatus is configured to form a message queue with messages corresponding to the plurality of sensors, and to send the message queue to the central control apparatus; and the central control apparatus is configured to extract the environmental information detected by the plurality of sensors from the message queue; and the apparatus state information comprises online state information of the sensors, which indicates whether communication links between the sensors and the central control apparatus are disconnected; and the central control apparatus is configured to compare an identifier of a sensor corresponding to each message in the received message queue with a stored identifier of the sensor, and to determine the online state information of the sensors according to a comparison result.

2. The system for monitoring the stage according to claim 1, wherein the apparatus state information comprises online state information of the at least part of the stage apparatuses, which indicates whether communication links between the at least part of the stage apparatuses and the central control apparatus are disconnected;

the at least part of the stage apparatuses are configured to periodically send heartbeat messages to the central control apparatus; and the central control apparatus is configured to determine the online state information of the at least part of the stage apparatuses based on the received heartbeat messages.

3. The system for monitoring the stage according to claim 1, wherein the apparatus state information comprises abnormality information of at least one of the sensors and the stage apparatuses; and the central control apparatus is configured to determine, in a case that an offline duration of an offline apparatus exceeds an offline duration threshold or a number of reconnections of an offline apparatus exceeds a threshold of reconnections, that the offline apparatus is abnormal, wherein the offline apparatus is the sensor or the stage apparatus.

4. The system for monitoring the stage according to claim 1, wherein the stage apparatuses comprise a play control apparatus and a display apparatus, wherein the play control apparatus is configured to control a play content of the display apparatus; and the central control apparatus is connected to the play control apparatus, and configured to receive a program playing list sent by the play control apparatus and to present the program playing list through the display.

5. The system for monitoring the stage according to claim 1, wherein the central control apparatus is further configured to present, by the display, at least one of the following contents:

a stage model, an operation state of the central control apparatus, a number of abnormalities of the stage apparatuses, a countdown for a target performance event, and energy consumption information of the stage apparatuses.

6. The system for monitoring the stage according to claim 1, wherein the display is further configured to provide a control interface for the stage apparatuses; and the central control apparatus is further configured to send an apparatus control instruction for a target stage apparatus according to a control operation on the control interface.

7. The system for monitoring the stage according to claim 6, wherein the control interface comprises a plurality of stage apparatuses and a control corresponding to each of the stage apparatuses.

8. The system for monitoring the stage according to claim 6, wherein the apparatus control instruction comprises a centralized control instruction and a single-path control instruction, wherein the centralized control instruction is configured to control a plurality of stage apparatuses of a same category, and the single-path control instruction is configured to control one of the corresponding stage apparatuses.

9. The system for monitoring the stage according to claim 1, wherein the central control apparatus is further configured to sequentially send, in response to a shutdown operation, a shutdown instruction to each of the stage apparatuses according to a set time interval, wherein different set time intervals correspond to different types of stage apparatuses; or, the central control apparatus is further configured to send, in response to a shutdown operation, a shutdown instruction to each of the stage apparatuses, wherein the shutdown instruction indicates that each of the stage apparatuses shuts down according to a respective set delay, different delays corresponding to different types of stage apparatuses; or, the central control apparatus is further configured to send, in response to a shutdown operation, a first shutdown instruction to the intermediate apparatus, wherein the intermediate apparatus is configured to send a second shutdown instruction to each of the corresponding stage apparatuses according to delays for different types of stage apparatuses.

10. A method for monitoring a stage, comprising:

detecting, by a plurality of sensors, in real time, environmental information of an environment where at least part of stage apparatuses are located, wherein the stage apparatuses comprise at least one type of various colors of spot lamps, dome lamps, ground screens, riser screens, audio apparatuses, stage lifting apparatuses, or smoke machines;

sending, by the plurality of sensors, the environmental information to a central control apparatus;

receiving, by the central control apparatus, the environmental information;

acquiring, by the central control apparatus, apparatus state information of at least one of the stage apparatuses and the sensors; and presenting, by the central control apparatus, the environmental information and the apparatus state information through a display;

wherein sending, by the plurality of sensors, the environmental information to the central control apparatus comprises:

sending, by the plurality of sensors, the environmental information to an intermediate apparatus;

converting, by the intermediate apparatus, the environmental information detected by a target sensor to a message under a target topic, wherein the target sensor is any one of the plurality of sensors, the target topic is a topic corresponding to the target sensor, and different topics correspond to different sensors; and sending, by the intermediate apparatus, the message under the target topic to the central control apparatus; and receiving, by the central control apparatus, the environmental information comprises:

acquiring, by the central control apparatus, the message under the target topic by subscribing the topic;

wherein sending, by the intermediate apparatus, the message under the target topic to the central control apparatus comprises:

forming, by the intermediate apparatus, a message queue with messages corresponding to the plurality of sensors, and sending the message queue to the central control apparatus; and receiving, by the central control apparatus, the environmental information comprises:

extracting, by the central control apparatus, the environmental information detected by the plurality of sensors from the message queue; and wherein the apparatus state information comprises online state information of the sensors, which indicates whether communication links between the sensors and the central control apparatus are disconnected; and acquiring, by the central control apparatus, the apparatus state information of the stage apparatuses comprises:

comparing, by the central control apparatus, an identifier of a sensor corresponding to each message in the received message queue with a stored identifier of the sensor, and determining the online state information of the sensors according to a comparison result.

11. The method for monitoring the stage according to claim 10, wherein the apparatus state information comprises abnormality information of at least one of the sensors and the stage apparatuses;

acquiring, by the central control apparatus, the apparatus state information of the at least one of the stage apparatuses and the sensors comprises:

determining, by the central control apparatus, that an offline apparatus is abnormal in a case that an offline duration of the offline apparatus exceeds an offline duration threshold or a number of reconnections of an offline apparatus exceeds a threshold of reconnections, wherein the offline apparatus is the sensor or the stage apparatus.

12. The method for monitoring the stage according to claim 10, wherein the stage apparatuses comprise a play control apparatus and a display apparatus, wherein the play control apparatus is configured to control a play content of the display apparatus; and the method further comprises:

receiving, by the central control apparatus, a program playing list sent by the play control apparatus; and presenting, by the display, the program playing list.

13. The method for monitoring the stage according to claim 10, further comprising:

sequentially sending, by the central control apparatus, a shutdown instruction to each of the stage apparatuses according to a set time interval in response to a shutdown operation, wherein different set time intervals correspond to different types of stage apparatuses;

or, sending, by the central control apparatus, a shutdown instruction to each of the stage apparatuses in response to a shutdown operation, wherein the shutdown instruction indicates that each of the stage apparatuses shuts down according to a respective set delay, different delays corresponding to different types of stage apparatuses;

or, sending, by the central control apparatus, a first shutdown instruction to the intermediate apparatus in response to a shutdown operation, wherein the intermediate apparatus is configured to send a second shutdown instruction to each of the corresponding stage apparatuses according to delays for different types of stage apparatuses, different delays corresponding to different types of stage apparatuses.

* * * * *